United States Patent [19]

Hitch

[11] Patent Number: 4,462,384
[45] Date of Patent: Jul. 31, 1984

[54] UNIVERSAL ADJUSTABLE REPLACEMENT GAS BURNER

[75] Inventor: Robert J. Hitch, Columbus, Ga.

[73] Assignee: W. C. Bradley Enterprises, Inc., Columbus, Ga.

[21] Appl. No.: 527,080

[22] Filed: Aug. 29, 1983

[51] Int. Cl.³ .............................................. F24C 3/00
[52] U.S. Cl. ................................................ 126/41 R
[58] Field of Search ..................................... 126/41 R

[56] References Cited

U.S. PATENT DOCUMENTS 4,092,975 6/1978 Grammatopoulos ............. 126/41 R

FOREIGN PATENT DOCUMENTS 1325436 8/1973 United Kingdom ............. 126/41 R

Primary Examiner—Carroll B. Dority, Jr.
Attorney, Agent, or Firm—Newton, Hopkins & Ormsby

[57] ABSTRACT

A replacement gas burner element for a gas barbecue grill is precisely adjusted vertically relative to the floor of the grill body by adjusting screws having lock nuts thereon. The replacement burner can also be positioned and stabilized relative to the forward and rear walls of the grill body by pairs of horizontal adjusting screws carried by the burner element and having lock nuts.

11 Claims, 7 Drawing Figures

UNIVERSAL ADJUSTABLE REPLACEMENT GAS BURNER

BACKGROUND OF THE INVENTION

Gas fired cooking grills generate intense heat which the heavy metal body and cover of the grill can withstand on a long term basis. However, the gas burner elements of such grills, being formed of relatively thin metal, are subject to deterioration in a much shorter time even when formed of stainless steel. Consequently, it is necessary to periodically replace the burner elements of gas fired barbecue grills.

A problem arises with such replacement in that a purchaser can not always readily find a burner element which properly fits the body of an older model grill or a grill body whose design has become obsolete. Accordingly, it is the objective of the present invention to provide a universal, adjustable, replacement gas burner element for gas fired barbecue grills which is adaptable to virtually any grill body regardless of its age and design.

More particularly, according to the invention, a replacement gas burner element having an adapter plate is provided which can be assembled with the telescopic delivery tube for the grill and adjusted vertically with precision and stabilized relative to the floor of the grill body. Furthermore, in accordance with a preferred embodiment of the invention, the replacement burner element can be positioned and stabilized relative to the front and rear walls of the grill body, regardless of the spacing between these walls encountered with various makes and models of gas fired barbecue grills.

The invention is characterized by extreme simplicity, convenience of installation, and economy. The device enables a purchaser of a replacement burner element to be confident that it can be successfully used with almost any existing grill body, thereby avoiding considerable inconvenience which has existed in the past with respect to replacement burner elements.

Other features and advantages of the invention will become apparent during the course of the following description.

DETAILED DESCRIPTION

Figure 1:
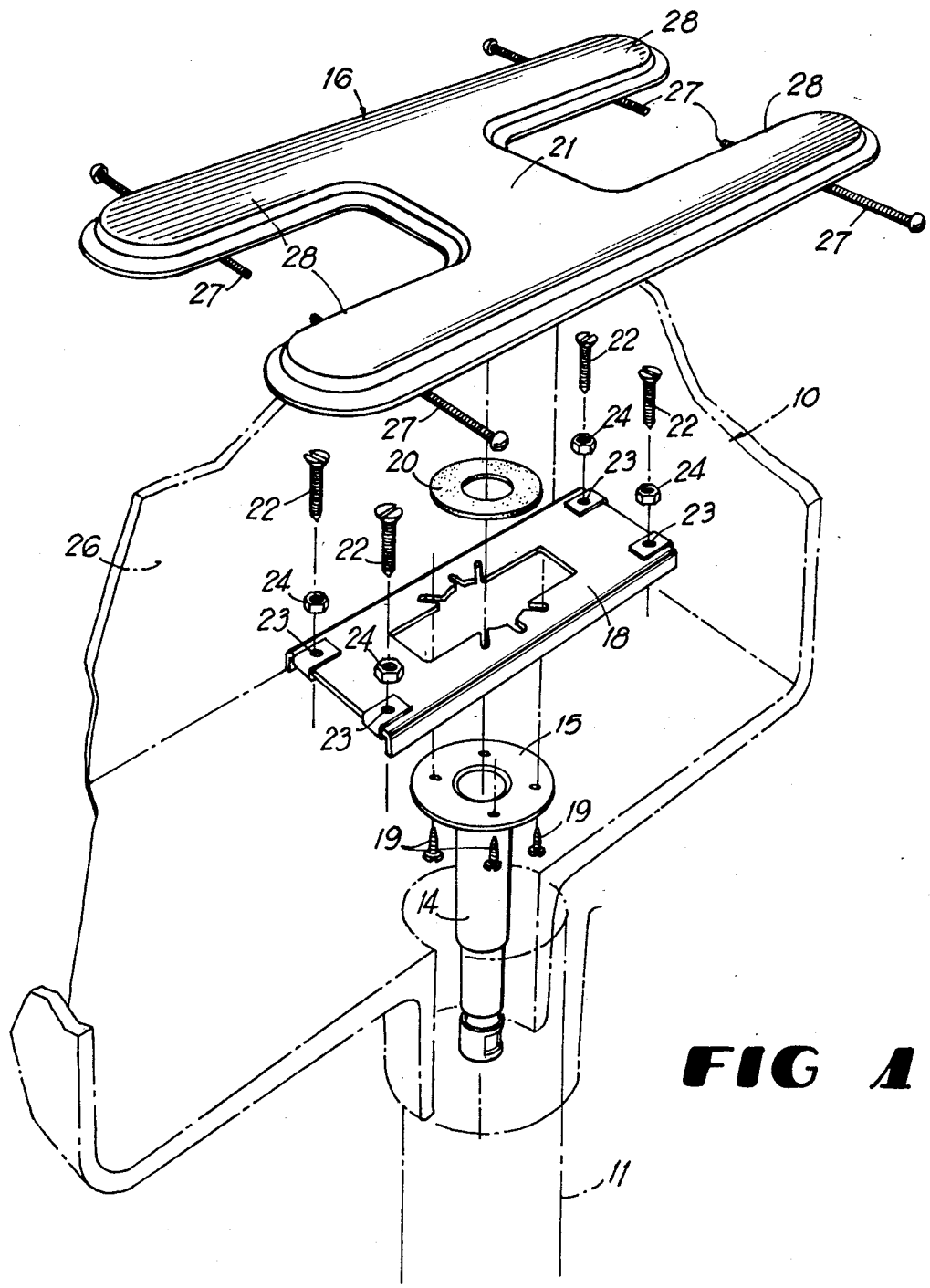
FIG. 1 is a fragmentary exploded perspective view of a replacement gas burner element and associated parts.

Referring to the drawings in detail, wherein like numerals designate like parts, and referring first to FIGS. 1 through 4, the body portion 10 of a gas fired barbecue grill is supported on the customary hollow post 11 at a convenient elevation. Gas is delivered to the grill burner through a supply pipe 12 within the post 11 equipped with a shut-off valve 13. From the supply pipe 12, the gas enters the burner element through a telescopically adjustable tube or fitting 14 whose upper section is equipped with a burner mounting flange 15.

In accordance with the present invention, a replacement gas burner element 16 of generally conventional form is provided, the original equipment burner element having been removed and discarded after deterioration due to prolonged exposure to intense heat.

The gas burner element 16 is substantially H-shaped in accordance with conventional practice and is provided entirely around the perimeter with gas flame apertures 17 in closely spaced relationship. Normally, the burner element spans the interior of the grill body portion for which it is designed substantially between its side and end walls.

The replacement burner element 16 has an adapter plate 18 provided therewith which is secured by screws 19 between the flange 15 and the bottom wall of the burner element, with a gasket 20 placed between the bottom wall and the adapter plate 18.

Figure 2:
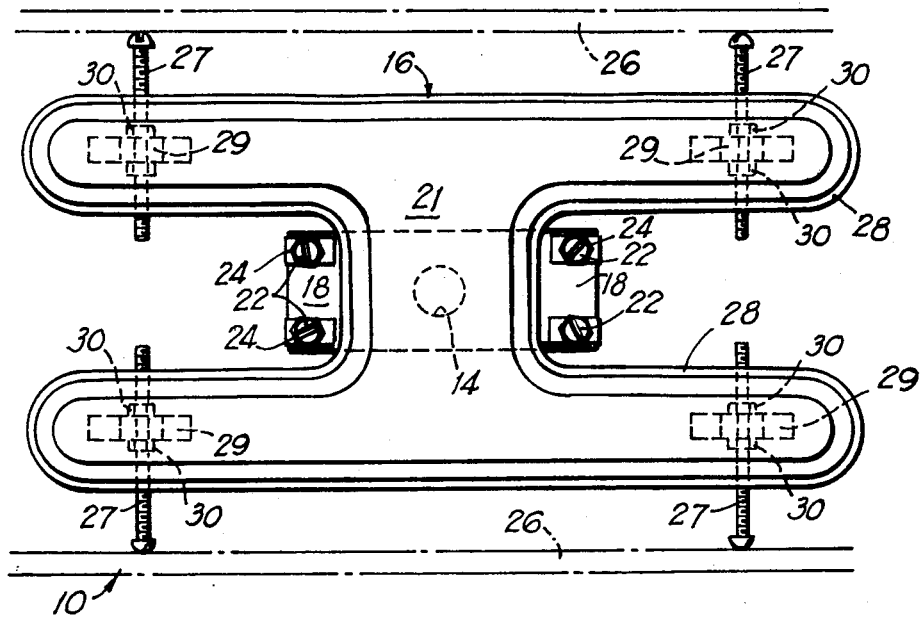
FIG. 2 is a plan view of the element in FIG. 1.
Figures 3, 4:
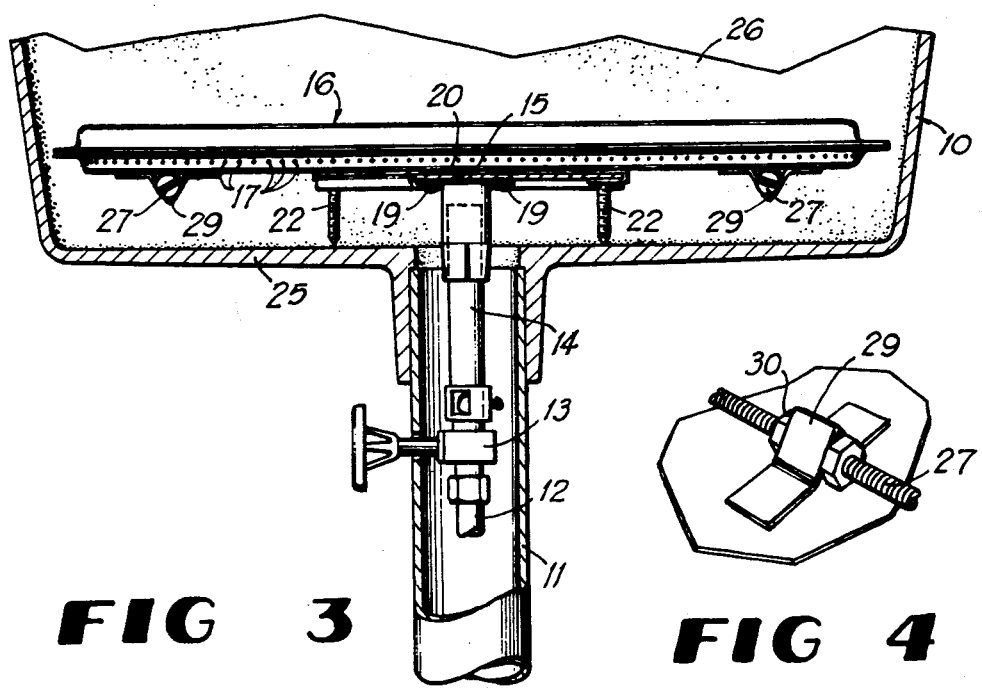
FIG. 3 is a side elevation of the installed replacement burner element with the grill body shown in vertical cross section.
FIG. 4 is a fragmentary perspective view showing a lowerside retainer element for screws which position and stabilize the replacement burner element in a horizontal plane.

As shown in FIG. 2, the adapter plate 18 projects on opposite sides of the central portin 21 of the burner element 16 and corner height adjusting and leveling screws 22 for the replacement burner element are received through corner threaded openings 23 of the adapter plate 18, and are locked in selected adjusted positions by lock nuts 24. By this means, the replacement burner element 16 can easily be positioned and held precisely at the required elevation above the floor 25 of the grill body portion 10.

Additionally, means is provided on the replacement burner element to position it and stabilize it laterally between the two side walls 26 of the grill body portion, irrespective of variations in side wall spacing on barbecue grills of different manufacturers or on different grill models. This means comprises adjusting and stabilizing screws 27 near the opposite ends of the H-shaped burner element 16 and on the lower side thereof, transversely of its parallel spaced arm portions 28. The horizontal screws 27 are held in V-brackets 29 fixed on the lower side of the burner element 16, with a pair of locking nuts 30 provided on each screw 27 at opposite sides of each V-bracket. By this means, the replacement burner element 16 is properly located and stabilized horizontally within the grill body 10. Together with the height adjusting screws 22, the replacement element can be properly placed and supported in substantially any known grill body, regardless of model or make. In this sense, the replacement element 16 is universal.

Figure 5:
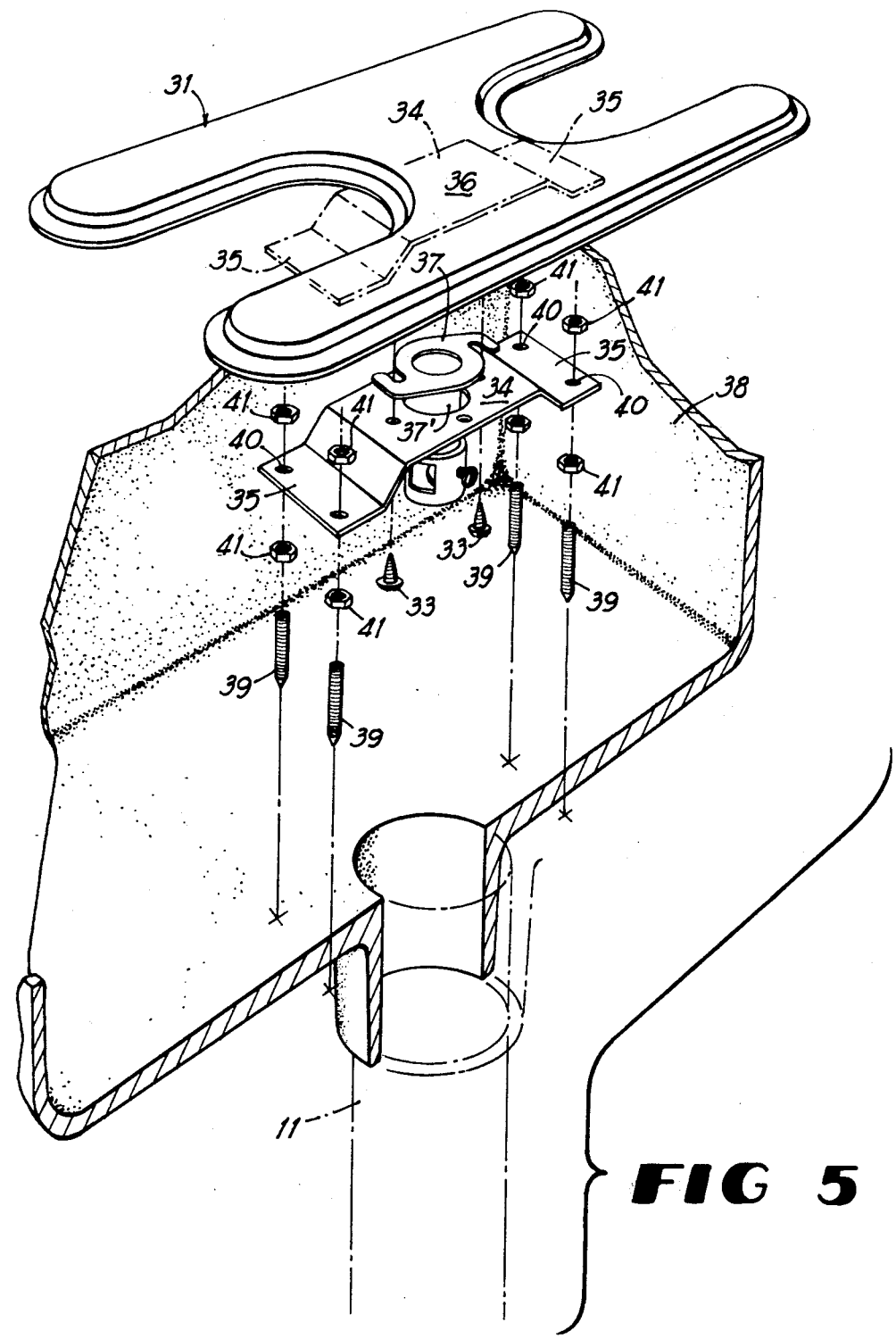
FIG. 5 is an exploded perspective view similar to FIG. 1 showing an alternative embodiment of the invention.
Figure 6:
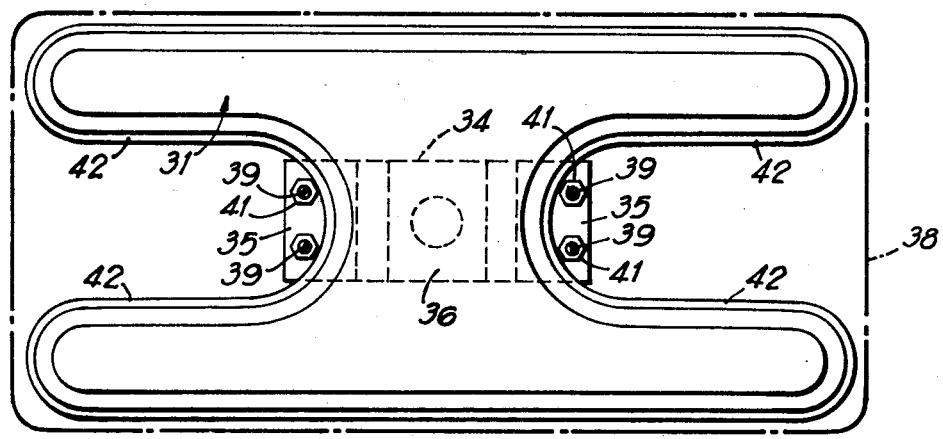
FIG. 6 is a plan view of the burner element and associated parts in FIG. 5.
Figure 7:
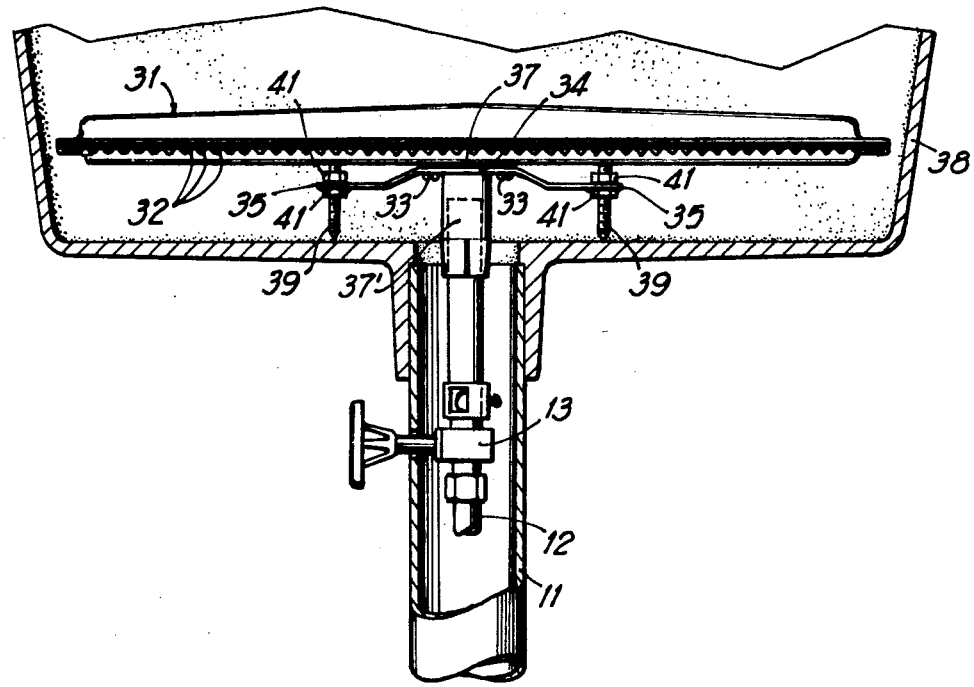
FIG. 7 is a side elevation of the burner element in FIG. 5 with the grill body shown in vertical cross section.

FIGS. 5 to 7 show an alternative embodiment of the invention in which a replacement gas burner element 31 has generally the same H-configuration as the previously-described element 16. It also has flame apertures 32 around its perimeter. The element 31 is secured by screws 33 to an adapter plate 34 having depressed end extensions 35 projecting on opposite sides of the center portion 36 of burner element 31. The screws 33 are also received by slots in a head flange 37 of a telescoping gas delivery tube 37' similar to the tube or fitting 14.

The height of the replacement burner element within the body portin 38 of the grill is adjusted by means of vertical axis screws 39 extending through apertures 40 of depresssed adapter plate extensions 35 and having locking nuts 41 provided thereon above and below the extensions 35. The screws and locking nuts are accessible on opposite sides of the center burner portion 36 and between its end portions 42, FIG. 6.

The embodiment of the invention in FIGS. 5 to 7 does not include the horizontal positioning and stabilizing means of the prior embodiment of the invention, the replacement element 31 being intended for use in grills whose body size and shape properly matches the dimensions of the replacement burner element.

It is to be understood that the forms of the invention herewith shown and descirbed are to be taken as preferred examples of the same, and tht various changes in the shape, size and arrangement of parts may be resorted to, without departing from the spirit of the invention or scope of the subjoined claims.

I claim:

1. A universal adjustable replacement gas burner element for a gas fired cooking grill having a body portion including a floor and being supplied with gas through a rising tubular fitting, said burner element being shaped to span a cooking grill body portion substantially for its length and width when placed therein, an adapter plate for the replacement burner element below it, means securing the adapter plate to the replacement burner element and to said tubular fitting, and vertical axis height adjusting and stabilizing screws for the replacement burner element threadedly engaged with the adapter plate and bearing on the floor of the cooking grill body portion.

2. A universal adjustable replacement gas burner element as defined in claim 1, and locking nuts on said adjusting and stabilizing screws and being engageable with one face of the adapter plate.

3. A universal adjustable replacement gas burner element as defined in claim 1, and the adapter plate having end portions depressed below the bottom surface of the replacement burner element, and said adjusting and stabilizing screws being received through apertures of said depressed end portions, and locking nuts on said screws above and below said depressed end portions.

4. A universal adjustable replacement gas burner element as defined in claim 1, and positioning screws on opposite sides of the replacement burner element substantially perpendicular to the vertical axis height adjusting and stabilizing screws and being adapted to engage opposing side walls of a cooking grill body portion.

5. A universal adjustable replacement gas burner element as defined in claim 4, and said positioning screws being disposed on the lower side of said burner element across opposite end portions thereof, retaining brackets for the positioning screws on the lower side of the burner element, and locking nuts for said positioning screws disposed on opposite sides of each retaining bracket.

6. In a gas fired cooking grill having a body portion including a floor and an upright axis tubular telescoping gas supply fitting projecting above said floor, the improvement comprising a replacement gas burner element for said grill adapted to be received in said body portion, an adapter plate connected between said replacement gas burner element and said telescoping fitting, and substantially vertical axis height adjusting and stabilizing screws for the replacement gas burner element connected with the adapter plate and bearing upon the floor of said body portion.

7. In a gas fired cooking grill as defined in claim 6, and said screws being threadedly engaged with the adapter plate.

8. In a gas fired cooking grill as defined in claim 6, and opposing pairs of substantially horizontal axis positioning and stabilizing screws carried by the replacement burner element and having corresponding ends adapted to engage spaced opposing side walls of a cooking grill body portion.

9. In a gas fired cooking grill as defined in claim 8, and retainer and locking means for said positioning and stabilizing screws on the lower side of the replacement burner element whereby such screws can be locked in selected adjusted positions.

10. In a gas fired cooking grill as defined in claim 6, and the adapter plate having end portions depressed to an elevation below said burner element and above said floor, and said adjusting and stabilizing screws being connected with said depressed end portions and having locking means.

11. A universal adjustable replacement gas burner for gas fired cooking grills comprising a burner body portion adapted for connection with a gas supply conduit, substantially vertical axis height adjusting and supporting screws for the replacement burner element on the burner element and being adapted to engage the floor of a cooking grill body, and substantially horizontal axis laterally projecting positioning and stabilizing screws carried by opposite sides of the replacement burner element and being adapted to engage opposing side walls of a cooking grill body.

* * * * *